Jan. 22, 1963   E. BROOKS   3,074,658
ROTORS FOR MIXING, PULVERISING AND LIKE MACHINES
Filed April 18, 1960   2 Sheets-Sheet 1

INVENTOR
Eric Brooks

BY
ATTORNEYS

Jan. 22, 1963  E. BROOKS  3,074,658
ROTORS FOR MIXING, PULVERISING AND LIKE MACHINES
Filed April 18, 1960  2 Sheets-Sheet 2
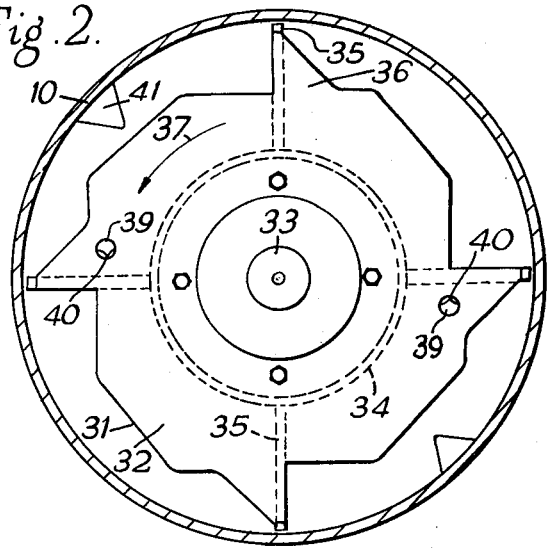
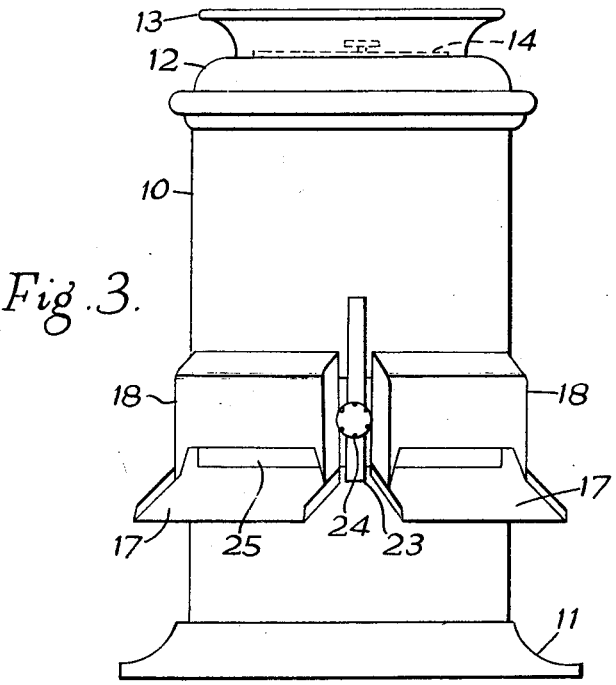
INVENTOR
Eric Brooks
BY *Norris & Bateman*
ATTORNEYS

United States Patent Office 3,074,658
Patented Jan. 22, 1963

3,074,658
ROTORS FOR MIXING, PULVERISING AND LIKE MACHINES
Eric Brooks, "Lynton," Netherton, Whalley, near Blackburn, England
Filed Apr. 18, 1960, Ser. No. 22,895
Claims priority, application Great Britain Apr. 18, 1959
6 Claims. (Cl. 241—291)

This invention relates to rotors for mixing, pulverising and like machines, and can be used for treating a large variety of materials, for example for cutting up and mixing vegetables, reducing fruit such as apples to small pieces or to form a puree, granulating biscuits of all kinds for re-use, crumbling bread, reducing cereals, crumbling cheese, mixing dough for bread making, cutting or mincing meat, breaking down a large variety of materials into either granular or powder form, and breaking up sand cores in foundries, but the invention is not restricted to these purposes as it can equally well be adapted for breaking up and/or mixing many substances. The invention is also concerned with mixing and/or pulverising machines incorporating the rotor.

According to the invention, a rotor for a mixing, pulverising or like machine comprises a plate adapted to be mounted for rotation about a vertical axis passing substantially through the centre of the plate and at right angles thereto, the plate having two or more radially disposed blades projecting at right angles from its under surface and extending beyond the periphery of the plate. The plate may be of any convenient shape, for example octagonal, and it may have a triangular fillet between its edge and the trailing side of the outwardly extending portion of each blade. Furthermore, there may be one or more agitator pins projecting from the surface of the plate opposite to the said blades.

A mixing, pulverising or like machine according to the invention, may comprise a substantially cylindrical chamber with means for rotatably mounting the rotor in the bottom of the chamber, means for driving the rotor, and an outlet opening and closure member therefor in the side wall of the chamber adjacent to the rotor. The closure member may be a solid closure when the machine is used for mixing, or it may be perforated when the machine is used for pulverising, granulating or like purposes. Preferably one or more deflectors is or are secured on the inner side wall of the chamber a short distance above the rotor to deflect material, which has been propelled against the chamber wall by the rotor, towards the centre of the chamber.

In order that the invention may be clearly understood and readily carried into effect, a mixing or pulverising machine incorporating a rotor constructed according to the invention, will now be described, by way of example only, with reference to the accompanying drawings, in which:

FIGURE 2 is a section on the line A—A of FIGURE 1, and

FIGURE 3 is a front view drawn to a smaller scale.

Figure 1:
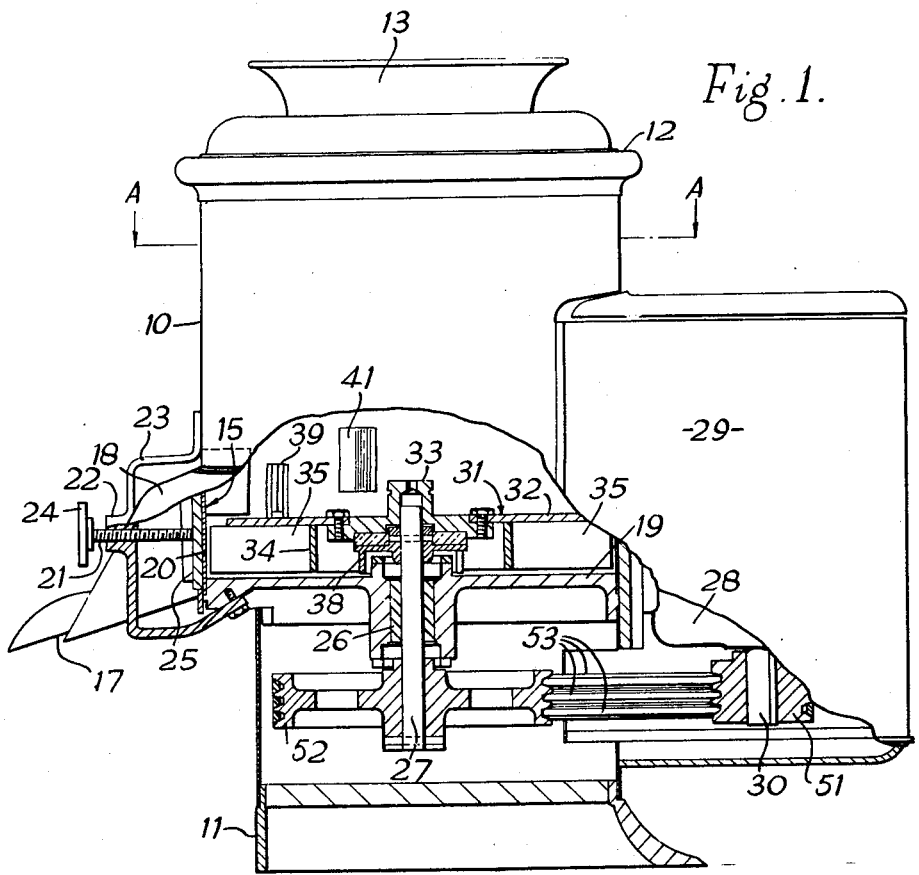
FIGURE 1 is a side elevation, partly in section, of the machine.

Referring to the drawings, the pulverising or mixing machine is generally of a known construction and comprises a cylindrical chamber 10 mounted on a base structure 11, a flanged member 12 having a feeding hopper or chute 13 being detachably mounted on the top of the chamber 10, a lid 14 being provided for closing the opening in the feeding hopper or chute 13. In this particular construction there are two outlet openings 15 in the side wall of the chamber, each opening 15 having a delivery chute 17 and a cowl 18, the outlet openings being disposed side by side and adjacent to the bottom 19 of the chamber 10. A detachable perforated screen 20 is adapted to extend over both outlet openings 15 and be retained in position by means of a screw 21 engaged in a boss 22 on a bracket 23 secured on the chamber wall between the two outlet openings 15, the screw 21 having a handwheel or knob 24 for manipulation purposes. It will be understood that a series of screens similar to the screen 20 may be provided but having different perforations so that a screen having pre-determined perforations can be disposed over the openings 15 according to the material being treated. A removable cover 25 is also provided to extend over both outlet openings 15 irrespective of whether or not a perforated screen is in position, the cover 25 also being retained in position by the screw 21.

A vertical bearing 26 is disposed in a central opening in the bottom 19 of the chamber, and a rotor shaft 27 is rotatably mounted in the bearing 26. The shaft 27 is driven by an electric motor 28 mounted in a housing 29 secured on the outside of the chamber 10, the motor shaft 30 having a multi-groove pulley 51 and the rotor shaft 27 also having a multi-groove pulley 52 on its lower end, V-belts 53 serving to transmit the drive from the motor shaft 30 to the rotor shaft 27.

The rotor, indicated generally at 31, is the main feature of the present invention. The rotor 31 comprises a plate 32 which, as seen in FIGURE 2, is substantially octagonal in shape and has a central hub 33 for mounting the rotor on the upper end of the shaft 27 in the lower end of the cylindrical chamber 10. An axially short cylinder 34 is secured on the underside of the plate 32 concentric with the hub 33 and four radially disposed blades 35, also secured to the underside of the plate 32, project outwardly from the cylinder 34 and beyond the octagonal periphery of the plate. However, the plate 32 has triangular extensions or fillets 36 disposed between the projecting portions of the blades 35 and the plate at the trailing sides of the blades in the sense of the direction of rotation of the rotor which is indicated in FIGURE 2 by the arrow 37. The cylinder 34 serves to obstruct material being treated from passing to the rotor shaft 27 and its bearing 26, but an additional baffle 38 is also provided for this purpose.

The rotor also has two upstanding agitator pins 39 which, as shown in FIGURE 2, are bevelled to provide a sharp edge 40 facing the direction of rotation of the rotor. It will be understood that there may be a single pin 39 or more than two such pins, and that there may be any described number of blades 35 instead of the four illustrated. Furthermore, the plate 32 need not be substantially octagonal, for example, it may be rectangular or triangular when three blades 35 are used, or circular with any number of blades, but in any case the plate must be smaller than the cross-sectional area of the chamber so that the blades will project beyond the plate, or it must have portions cut away from its periphery adjacent to the forwardly facing sides of the blades.

When in use, with material to be treated having been fed into the chamber, and resting on the rotor, as the rotor is rotating, the material will be acted upon by both the blades 35 and the agitator pins 39, and there will be a tendency for the material to be thrown against the wall of the chamber 10. Consequently deflectors 41 are secured on the inside wall of the chamber to deflect material towards the centre of the chamber. Although two deflectors are shown in FIGURE 2, any convenient number of deflectors may be employed and they may extend from a position slightly above the plate 32 to any desired level below the top of the chamber 10.

In use, for mixing dry materials either alone or with added liquid, the mover 25 is secured over the outlet openings 15 by means of the screw 21, the motor 28 is started up to drive the rotor, the materials are fed through the hopper 13 into the chamber 10, and the lid 14 is fitted in the hopper 13. The machine is allowed to run for a pre-determined time which of course will depend upon the materials being mixed, and the cover 25 is then removed. It may be necessary in some cases to stop the motor before removing the cover 25. With the cover 25 removed, and the rotor driven by the motor, the mix will be ejected by the rotor through the openings 15. If desired, a screen 20 may be placed over the openings, the cover 25 being then secured over the screen, and when mixing is complete, the cover only is removed so that the material will be ejected through the screen, thus preventing large pieces or clumps of the materials being discharged.

For pulverising or reducing materials, the procedure is very similar, except that it is not necessary to fit the cover 25, a screen 20 having openings of a desired size being fitted over the openings 15 so that as the material is broken up, it will be ejected through the screen 20.

I claim:

1. A rotor for use in a comminuting or mixing apparatus comprising a hub section and a plate section rigid with said hub section, a drive shaft mounting said hub section for rotation about a substantially horizontal axis, said plate section extending substantially horizontally and having a smooth top face and defining with said hub section an imperforate surface for supporting the material to be worked on, at least two radially disposed blades rigid with said plate section and projecting downwardly from the under surface of said plate section to extend entirely below said plate section, each of said blades having a leading material engaging surface and a trailing surface facing in the opposite direction from said leading surface, the outer periphery of said plate section being continuous and irregularly shaped such that a substantial portion of the leading surface of each blade extends beyond the adjacent periphery of said plate section extending circumferentially forwardly of the blade in the direction of rotation and a reduced portion of the trailing surface of each blade which is substantially less than said substantial leading surface portion extends beyond the adjacent periphery of said plate section extending circumferentially rearwardly of each blade.

2. A rotor for a comminuting or like machine comprising a plate adapted to be rotated about a central vertical axis and having an irregular outer periphery, at least two fixed generally radial material moving blades projecting downwardly from the underside of said plate, and each blade having its outer end projecting beyond the plate periphery, and with the plate periphery at the leading side of said blade during rotation extending generally radially along the blade for a material distance inwardly of said outer end.

3. The rotor defined in claim 2, wherein said plate has a radial outward extension above each blade, one side of each said extension being substantially coextensive with the leading side of said blade and defining said inwardly extending part of the plate periphery and angularly intersecting an adjacent part of the blade periphery which extends away therefrom in the direction of rotation of said plate.

4. The rotor defined in claim 2, wherein an annular material baffle concentric with the plate axis extends down from the plate around the inner ends of said blades.

5. A rotor for a mixing, pulverizing or like machine comprising a horizontal plate having an irregularly shaped outer periphery bounding an imperforate upper surface adapted to support material to be pulverized and mounted for rotation about a vertical axis passing substantially through the center of the plate, said plate having at least two radially disposed material moving blades rigid therewith projecting downwardly at right angles from its under surface and having outer end portions projecting radially outwardly beyond the periphery of said plate with the upper edges of the blades beyond said periphery being disposed below the plane of said plate, and said plate periphery being of such shape that a materially larger and longer portion of each blade surface projects radially outwardly beyond that part of the periphery of the plate that extends circumferentially away from the leading side of that blade during rotation of the plate than projects radially outwardly of the plate periphery at the trailing side of the blade.

6. The rotor defined in claim 5, including at least one material agitating member rigidly extending vertically upwardly from the upper surface of the plate and having a sharp edge facing in the direction of rotation of said plate.

References Cited in the file of this patent

UNITED STATES PATENTS

| | | |
|---|---|---|
| 40,854 | Randall | Dec. 8, 1863 |
| 1,633,164 | Cruikshank | June 21, 1927 |
| 2,321,599 | Hofmann | June 15, 1943 |
| 2,482,125 | Powers | Sept. 20, 1949 |
| 2,639,096 | Hinerfeld | May 19, 1953 |
| 2,665,852 | Shively | Jan. 12, 1954 |
| 2,832,546 | Sprague | Apr. 29, 1958 |